(12) United States Patent
Ohira

(10) Patent No.: US 7,524,539 B2
(45) Date of Patent: Apr. 28, 2009

(54) GOLF BALL PREPARATION METHOD AND GOLF BALL

(75) Inventor: Takashi Ohira, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 1205 days.

(21) Appl. No.: 10/662,330

(22) Filed: Sep. 16, 2003

(65) Prior Publication Data

US 2004/0052970 A1 Mar. 18, 2004

(30) Foreign Application Priority Data

Sep. 18, 2002 (JP) .............................. 2002-271879

(51) Int. Cl.
*C08F 2/48* (2006.01)
(52) U.S. Cl. ..................... 427/508; 427/553; 427/558
(58) Field of Classification Search ................ 427/508, 427/553, 558
See application file for complete search history.

(56) References Cited

U.S. PATENT DOCUMENTS

| 4,145,501 | A | * | 3/1979 | Kaiya et al. ................. 526/217 |
| 5,089,376 | A | * | 2/1992 | Setthachayanon ........ 430/284.1 |
| 5,300,325 | A | * | 4/1994 | Nealon et al. ................ 427/379 |
| 5,542,680 | A | | 8/1996 | Proudfit et al. |
| 6,165,564 | A | | 12/2000 | Crast et al. |
| 6,255,382 | B1 | | 7/2001 | Hamada et al. |
| 6,319,983 | B1 | * | 11/2001 | Lokai et al. .................... 525/28 |
| 2002/0016226 | A1 | * | 2/2002 | Jin et al. ...................... 473/378 |

FOREIGN PATENT DOCUMENTS

| JP | 08-071177 A | 3/1996 |
| JP | 08-229162 A | 9/1996 |

OTHER PUBLICATIONS

Japanese Office Action dated Oct. 4, 2006 (including its translation).

* cited by examiner

*Primary Examiner*—Elena T Lightfoot
(74) *Attorney, Agent, or Firm*—Sughrue Mion, PLLC

(57) ABSTRACT

Golf balls are prepared by forming a layer of a primer composition comprising an aqueous resin having UV-curable functional groups in a molecule and a crosslinker on the cover surface of a golf ball, applying a UV-curable paint onto the layer, and irradiating the layers with UV radiation for curing. The method permits any well-known UV-curable paint to be used and applied to golf balls to establish a sufficient degree of adhesion. The bond strength between the cured paint coating and the ball surface is enhanced so that the paint coating has abrasion durability.

5 Claims, No Drawings

GOLF BALL PREPARATION METHOD AND GOLF BALL

TECHNICAL FIELD

This invention relates to a method for preparing a coated golf ball whose coating surface has improved abrasion resistance and a golf ball prepared thereby.

BACKGROUND ART

Prior art UV curable paints are less adherent to ionomer resins and urethane resins commonly used as the cover of golf balls. The cured coatings of such UV curable paints suffer from the problem of poor bond strength to ionomer resins and urethane resins.

Crast et al., U.S. Pat. No. 6,165,564 discloses to add a carbodiimide resin to a UV curable coating as an adhesion improver. There is still left a room for improvement in the adhesion between the coating and the golf ball surface.

With the desire to improve the adhesion of UV curable paint to golf balls, attempts were made to blend in the UV curable paint a component which is expected to achieve an improvement in adhesion, typically an isocyanate compound, but failed to achieve a practically acceptable level of adhesion.

Since these approaches originate from the technique of improving the adhesion of two-part cure type urethane coating compositions commonly used in golf balls, they are not effective for improving the adhesion of UV-curable paints which rely on a different reaction scheme from the urethane.

SUMMARY OF THE INVENTION

An object of the present invention is to provide a method for preparing a golf ball having a cured coating of UV-curable paint on the cover surface wherein the coating has improved abrasion resistance and the bond strength between the coating and the cover surface is enhanced. Another object is to provide a golf ball prepared thereby.

It has been found that when a primer composition containing an aqueous resin having UV-curable functional groups in a molecule and a crosslinker is applied to the cover surface of the golf ball to form a primer layer, a UV-curable paint is then applied to the primer layer to form a paint layer as topcoat, and the layers are irradiated with UV radiation, the paint layer is bonded to the cover surface at a practically acceptable level and exhibits improved abrasion resistance.

Therefore, the present invention provides a method for preparing a golf ball, comprising the steps of forming a layer of a primer composition comprising an aqueous resin having UV-curable functional groups in a molecule and a crosslinker on the cover surface of a golf ball; applying a UV-curable paint onto the layer; and irradiating the layers with UV radiation.

A golf ball prepared by the method is also contemplated herein.

DESCRIPTION OF THE PREFERRED EMBODIMENTS

According to the method of the present invention, a golf ball is prepared by forming a layer of a primer composition on the cover surface of a golf ball, applying a UV-curable paint onto the primer layer to form a paint layer, and irradiating the layers with UV radiation for curing both the primer layer and the UV-curable paint layer. The primer composition contains an aqueous resin having UV-curable functional groups in a molecule and a crosslinker.

As used herein, UV-curable functional groups denote functional groups capable of inducing crosslinking reaction upon exposure to UV radiation while no other particular limitation is imposed thereto. They may be either functional groups capable of initiating reaction upon exposure to UV radiation or functional groups capable of reacting with reactive sites generated by a UV initiator.

Illustrative examples of UV-curable functional groups include (meth)acrylic groups, cinnamoyl groups and azido groups. Inter alia, (meth)acrylic groups are preferred from the standpoint of versatility in resin design. The functional groups included may be of one type or in admixture of two or more types.

As used herein, the term "aqueous resin" means that a resin can be dissolved or dispersed in water. While the aqueous resins are divided into water-soluble resins and water-dispersible resins depending on the stabilized state of the resin in water, the present invention favors water-dispersible resins as the aqueous resin having UV-curable functional groups in a molecule.

In terms of particle size, the water-dispersible resins are sub-divided into colloidal dispersion type (particle size approx. 0.005-0.05 µm) and emulsion type (particle size approx. 0.05-0.5 µm). In terms of the dissolution mechanism in water, the water-dispersible resins are sub-divided into anionic, cationic and nonionic types. When included in the composition of the invention, any type of water-dispersible resin can be used without constraints of sub-division.

The aqueous resins may be based on urethane resins, acrylic resins and polyester resins, for example. Urethane resins are preferably selected from the standpoint of adhesion to the substrate surface.

The aqueous resins can be prepared by introducing water-soluble groups into various base resins. Suitable water-soluble groups to be introduced into base resins include acidic groups such as carboxyl and sulfonate groups, and basic groups such as amino groups. These water-soluble groups form salts with other groups (or atoms) having a salt-forming ability, and thus become stabilized in water.

Preferred water-soluble groups to be introduced into the aqueous resins are carboxyl groups because of the affinity and adhesion of coatings to ionomer resins and urethane resins used in golf ball covers. The preferred group having a salt-forming ability to the carboxyl group is ammonia, though not limited thereto, because it will volatilize upon drying and curing.

The aqueous resins having UV-curable functional groups in a molecule are commercially available, for example, under the trade name of NeoRad NR-440 (Kusumoto Chemicals, Ltd.).

The crosslinkers included in the primer compositions include, for example, carbodiimide, ethyleneimine, oxazoline and epoxy base crosslinkers. Of these, carbodiimide and ethyleneimine base crosslinkers are preferred. Suitable carbodiimide base crosslinkers include N,N'-dicyclohexylcarbodiimide and 1-ethyl-3-(3-dimethylaminopropyl)carbodiimide. Suitable ethyleneimine base crosslinkers include 2,2-bishydroxymethylbutanol-tris(3-(1-aziridinyl)propionate) and diphenylmethane-bis-4,4'-N,N'-diethyleneurea, with 2,2-bishydroxymethylbutanol-tris(3-(1-aziridinyl)propionate) being most preferred. The crosslinkers may be used alone or in admixture of two or more.

In the practice of the invention, the crosslinker is commercially available, for example, under the trade name of Carbodilite V-02-L2 (Nisshinbo Industries, Inc.), Chemitite PZ-33 and Chemitite DZ-22F (Nippon Shokubai Co., Ltd.). Inter alia, Carbodilite V-02-L2 and Chemitite PZ-33 are preferred.

In the primer composition containing a resin having UV-curable functional groups in a molecule and a crosslinker, the amount of the crosslinker is usually at least 0.5 parts by weight per 100 parts by weight of the resin. The upper limit amount is usually up to 30 parts by weight, preferably up to 20 parts by weight per 100 parts by weight of the resin. With an excessive amount of the crosslinker, the coating may be left tacky on the surface. Too small an amount of the crosslinker may fail to achieve a bond strength.

In the primer composition according to the invention, photoinitiators, diluents, leveling agents, antifoamers, thixotropic agents, surface modifiers, colorants, UV screening agents, photostabilizers, fluorescent materials and fluorescent brighteners may be included in addition to the aqueous resin and crosslinker described above insofar as this does not compromise the objects of the invention.

Any desired method may be used in applying the primer composition of the invention to the surface of golf balls. Desirably the primer composition is dissolved or dispersed in a suitable solvent and then applied to golf balls because this method ensures ease of coating operation, uniform coating and uniform coating thickness. The application is desirably followed by heat curing at relatively low temperatures. The solvent used herein is most preferably water, which may contain other solvents, for example, alcohols such as methanol, ethanol and isopropyl alcohol insofar as the objects of the invention are not impaired.

When the primer composition is applied to golf balls, the composition usually has a viscosity of at least 10 centipoises (cp), preferably at least 20 cp, and the upper limit viscosity is usually up to 50 cp, preferably up to 40 cp. Too high a viscosity may interfere with atomization during the application whereas a composition with too low a viscosity may run down after application. Therefore, when the resin having UV-curable functional groups in a molecule is dissolved or dispersed in a solvent, the resin concentration is adjusted so as to provide a viscosity within the above-defined range. For application, any desired technique such as air gun painting or electrostatic painting may be used. Differently stated, the viscosity of the composition to be applied may also be adjusted to an efflux time of 5 to 22 seconds, preferably 10 to 18 seconds as measured by Ford Dip Cup #4.

No particular limits are imposed on the material of which is made the surface layer of golf balls to be coated with the primer composition according to the invention. The primer composition is applicable to any of cover layers of materials based on ionomer resins, urethane resins and hard rubber. The primer composition develops a high degree of adhesion or bond particularly when the surface to be coated is given by cover layers of ionomer resin-based materials.

Without any treatment of the golf ball surface prior to coating, the primer composition is applicable to the ball surface at a practically acceptable level. However, the pre-treatment of the golf ball surface need not be prohibited. If the pre-treatment of the golf ball surface is desired, any of well-known surface treatment techniques may be used. Suitable surface treatments include surface activation by oxidation or chlorination, and surface roughening by corona discharge treatment, sand blasting or the like.

After the primer layer is formed on the cover surface and dried, a UV-curable paint is applied thereto. For drying of the primer layer, heat drying is preferred. The heat drying temperature is usually at least 40° C., preferably at least 50° C., and usually up to 70° C., preferably up to 60° C. The heat drying time is usually at least 15 minutes, preferably at least 25 minutes and usually up to 180 minutes, preferably up to 60 minutes. If the heat drying temperature is too low or the time is too short, such under-heating may cause insufficient drying and poor bonding. If the temperature is too high, the outer appearance can be adversely affected. Too long a time is wasteful in productivity.

In the practice of the invention, any well-known UV-curable paints may be used as long as they cure upon UV exposure. The UV-curable paint is commercially available, for example, under the trade name of Dapco Beem No. 900 Clear (Daishin Paint Co., Ltd.).

According to the method of the present invention, a golf ball is prepared by applying a primer composition to the cover surface of a golf ball to form a primer layer, applying a UV-curable paint onto the primer layer to form a paint layer, and irradiating the layers with UV radiation for curing the primer layer and the UV-curable paint layer at the same time.

The primer layer usually has a thickness of 3 to 15 μm, especially 5 to 12 μm. Too thick a primer layer may alter the shape of dimples on the cover surface whereas too thin a primer layer may fail to achieve the desired adhesion and durability. The UV-curable paint layer usually has a thickness of 5 to 30 μm, especially 10 to 20 μm. Too thick a paint layer may cause insufficient drying or alter the shape of dimples whereas too thin a paint layer may fail to achieve the desired durability. The total thickness of primer and UV-curable paint layers is usually in a range of 8 to 45 μm, preferably 15 to 32 μm. Too large a total thickness may fail to maintain the shape of dimples whereas too small a total thickness may fail to achieve the desired durability.

According to the invention, the cover surface of golf balls is coated with the primer and the UV-curable paint in the above-described manner. The golf balls to which the invention is applicable include one-piece golf balls, solid golf balls including two-, three- and multi-piece golf balls, and thread-wound golf balls. Except for the coating process described herein, these golf balls may be of well-known construction and produced by well-known methods.

EXAMPLE

Examples and Comparative Examples are given below for illustrating the invention although the invention is not limited by the Examples.

Preparation Examples 1-11

Primer compositions for golf balls were prepared by mixing components according to the formulation shown in Table 1 wherein amounts are expressed in parts by weight.

TABLE 1

|  |  | Preparation Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Aqueous resin | NeoRad NR-440 | 100 | 100 | 50 | 20 | 100 | 100 |  | 100 | 100 | 100 | 100 |
|  | Boncoat CG5030 |  |  | 50 | 80 |  |  | 100 |  |  |  |  |
| Crosslinker | Carbodilite V-02-L2 | 10 | 10 | 10 | 10 | 5 |  | 10 |  |  |  |  |
|  | Chemitite PZ-33 |  |  |  |  |  | 10 |  |  |  | 5 | 0.5 |
|  | Epocross WS-500 |  |  |  |  |  |  |  |  | 10 |  |  |

TABLE 1-continued

|  |  | Preparation Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Photoinitiator | Irgracure 184 | 0.8 | | | | | | | | | | |
| Water |  | 30 | 30 | 30 | 30 | 30 | 30 | 30 | 30 | 30 | 30 | 30 |

NeoRad NR-440: aqueous UV/EB-curable aliphatic urethane dispersion, solids 40%, viscosity 90-120 cp (25° C.), urethane acrylic oligomer, Kusumoto Chemicals, Ltd.

Boncoat CG5030: aqueous acrylic urethane emulsion, solids 50%, Dainippon Ink & Chemicals, Inc.

Carbodilite V-02-L2: polycarbodiimide crosslinker, solids 40%, carbodiimide equivalent 601 (relative to resin), Nisshinbo Industries, Inc.

Chemitite PZ-33: ethyleneimine crosslinker, solids at least 99%, Nippon Shokubai Co., Ltd.

Epocross WS-500: oxazoline crosslinker, solids 40%, Nippon Shokubai Co., Ltd.

Irgacure 184: photoinitiator, Ciba Specialty Chemicals

Examples 1-9 & Comparative Examples 1-5

The combination of golf ball cover, primer and topcoat is shown in Table 2. Each of the primer compositions of Preparation Examples 1 to 11 was applied to the cover surface of a two-piece solid golf ball to a thickness of 8 μm and heat dried under different conditions or irradiated with UV radiation. Thereafter, a UV-curable clear paint Dapco Beem No. 900 Clear (Daishin Paint Co., Ltd.) was applied to the primer layer to a thickness of 15 μm and irradiated with UV radiation to form a topcoat layer. UV exposure was carried out at a power of 80 W/cm and a distance of 10 cm and over the entire surface by rotating the ball at a conveyor speed of 6 m/min.

Abrasion tests using sand or sand and water were performed on the coated surfaces of the golf balls, with the results shown in Table 2.

Heat Drying Conditions
 a: 55° C., 5 minutes
 b: 55° C., 30 minutes

Sand abrasion test

A porcelain ball mill having an internal volume of 4 liters was charged with 15 coated golf balls and 1.5 liters of abrasive (Showa Denko K.K., Shorel Nugget SN, size 5S) and operated for milling at 60 rpm for 2 hours. The surface state of the ball as abraded was visually observed and the balls were rated according to the following criterion.

⊚ no peeling
○: slight peels at lands around dimples
Δ: many peels at lands around dimples
X: peels on the entire surface Sand/Water Abrasion Test Coated golf balls were milled as in the sand abrasion test except that 1.5 liters of water was added to the abrasive. Based on the surface state observed, the balls were rated according to the following criterion.

⊚ no peeling
○: slight peels at lands around dimples
X: peels on the entire surface The method of preparing golf balls according to the invention permits any well-known UV-curable paint to be used and applied to golf balls to establish a sufficient degree of adhesion or bond to the ball surface. Coated golf balls having the enhanced bond strength between a cured coating of UV-

TABLE 2

|  |  | Example | | | | | | | | | Comparative Example | | | | |
|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 |
| Golf ball cover |  | A | A | A | A | A | A | A | A | A | A | A | A | A | B |
| Primer layer | Preparation Example | 1 | 2 | 3 | 4 | 5 | 6 | 9 | 10 | 11 | 1 | 7 | 8 | No | No |
|  | Heat drying conditions | b | b | b | b | b | b | b | b | b | a | b | b | No | No |
|  | UV irradiation | No | No | No | No | No | No | No | No | No | Yes | No | No | No | No |
| Topcoat layer | Heat drying conditions | a | a | a | a | a | a | a | a | a | a | a | a | a | a |
|  | UV irradiation | Yes | Yes | Yes | Yes | Yes | Yes | Yes | Yes | Yes | Yes | Yes | Yes | Yes | Yes |
| Evaluation | Sand abrasion test | ⊚ | ⊚ | ⊚ | ⊚ | ⊚ | ⊚ | ○ | ⊚ | ⊚ | X | Δ | X | X | Δ |
|  | Sand/water abrasion test | ⊚ | ⊚ | ⊚ | ○ | ○ | ⊚ | X | ⊚ | ○ | X | X | X | X | X |

Golf Ball Cover

A: 50/50 Himilan 1605/Himilan 1706 mixture (ionomer resins by Dupont-Mitsui Polychemicals Co., Ltd.)

B: urethane resin Pandex T-R3080 (Bayer-DIC Polymer Co., Ltd.)

curable paint and the ball surface are produced. In the golf balls prepared by the inventive method, the paint coating is durably abrasion resistant.

Japanese Patent Application No. 2002-271879 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a golf ball, comprising the steps of:
   coating a layer of a primer composition comprising an aqueous resin having UV-curable functional groups in a molecule and a crosslinker on the cover surface of a golf ball,
   applying a UV-curable paint onto the layer, wherein the primer composition layer is not irradiated with UV radiation prior to having the UV-curable paint applied thereon, and
   irradiating the layers with UV radiation, thereby permitting both of the primer composition layer and the UV-curable paint to cure at the same time.

2. The method of claim 1, wherein the UV-curable functional groups are selected from the group consisting of (meth) acrylic groups, cinnamoyl groups and azido groups.

3. The method for preparing a golf ball of claim 1, wherein the aqueous resin is prepared by introducing water-soluble groups into base resins wherein the water-soluble groups are selected from the group consisting of carboxyl group, sulfonate groups, and amino groups.

4. The method for preparing a golf ball of claim 1, wherein the crosslinker included the primer composition is a carbodiimide-based crosslinker or an ethyleneimine-based crosslinker.

5. The method for preparing a golf ball of claim 1, wherein the layer of the primer composition has a thickness ranging from 5 to 12 μm, and the total thickness of the primer and UV-curable paint layers ranges from 15 to 32 μm.

* * * * *